(12) United States Patent
Chikkala et al.

(10) Patent No.: US 11,182,281 B2
(45) Date of Patent: Nov. 23, 2021

(54) RULE TESTING FRAMEWORK FOR EXECUTABLE RULES OF A SERVICE PROVIDER SYSTEM

(71) Applicant: PayPal, Inc., San Jose, CA (US)

(72) Inventors: Raveendra Babu Chikkala, Chennai (IN); Ramaguru Ramasubbu, Chennai (IN)

(73) Assignee: PAYPAL, INC., San Jose, CA (US)

( * ) Notice: Subject to any disclaimer, the term of this patent is extended or adjusted under 35 U.S.C. 154(b) by 21 days.

(21) Appl. No.: 16/729,084

(22) Filed: Dec. 27, 2019

(65) Prior Publication Data
US 2021/0200665 A1 Jul. 1, 2021

(51) Int. Cl.
| | |
|---|---|
| *G06F 9/44* | (2018.01) |
| *G06F 11/36* | (2006.01) |
| *G06N 5/02* | (2006.01) |
| *G06Q 20/10* | (2012.01) |

(52) U.S. Cl.
CPC ...... *G06F 11/3692* (2013.01); *G06F 11/3684* (2013.01); *G06N 5/027* (2013.01); *G06Q 20/10* (2013.01)

(58) Field of Classification Search
CPC . G06F 11/3692; G06F 11/3684; G06N 5/027; G06Q 20/10
See application file for complete search history.

(56) References Cited

U.S. PATENT DOCUMENTS

| | | | | |
|---|---|---|---|---|
| 2004/0260516 A1* | 12/2004 | Czerwonka | ......... | G06F 11/3684 702/186 |
| 2012/0260132 A1* | 10/2012 | Blue | ................. | G06F 11/3676 714/38.1 |
| 2015/0178625 A1* | 6/2015 | Berlandier | ......... | G06Q 10/0637 706/11 |
| 2015/0356001 A1* | 12/2015 | Murugesan | ......... | G06F 11/3684 717/124 |

* cited by examiner

*Primary Examiner* — Hang Pan
(74) *Attorney, Agent, or Firm* — Haynes and Boone, LLP (57) ABSTRACT

There are provided systems and methods for a rule testing framework for executable rules of a service provider system. During processing rule implementation and/or testing for rules currently implemented in production systems, different values for the variables and attributes of the rule may be required to be tested to ensure proper rule functioning. In order to test the rule, the expression of the rule is determined, and each variable is considered in turn. The expression is evaluated so that the selected variable becomes the output of the expression. Thus, the values of the other variables may then be determined so that the selected variable is the output of the expression. The rule may then be tested for positive and negative values of the selected variable so that the rules functioning for the selected variable is tested.

20 Claims, 5 Drawing Sheets

RULE TESTING FRAMEWORK FOR EXECUTABLE RULES OF A SERVICE PROVIDER SYSTEM

TECHNICAL FIELD

The present application generally relates to rule testing for data processing and business rule engines of a service provider, and more specifically to utilizing simplified expressions to linearly test rule engine outputs.

BACKGROUND

A service provider, such as a payment service provider and/or transaction processor, may implement rule engines that provide decision-making features and implement processes based on rules of the service provider. These rules may correspond to various business rules, which implement and organize business processes into rule engines that allow for automated execution of processes based on particular attributes of users, transactions, accounts, or other input to the rule engine for processing. For example, rules may be associated with transaction processing, risk mitigation, accounting, account validity and maintenance, technical support, promotional programs, advertising and/or benefits programs, etc. However, when implementing rules for the service provider's framework and system or making changes to deployed rules, developers require testing that allow for determination of whether the rule is functioning properly to build and customize the business processes of the service provider. Since rules can have hundreds, if not thousands, of different attributes that may have different values for input, this testing process is laborious and time consuming to iterate over all the potential input values for the attributes, Thus, rule testing for roll-out of rules requires lengthy testing periods and large amounts of computing resources.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a rule testing framework for executable rules of a service provider system. Systems suitable for practicing methods of the present disclosure are also provided.

A service provider system may implement different types of rules into their systems and rules engines, where the rules are utilized to provide services, processes, and operations of the service provider. In this regard, a transaction processor provides electronic transaction processing services to users that allow for users to process transactions electronically, where rules engines of the transaction processor may be used to provide services and operations associated with those services. These services may include electronic transaction processing (e.g., accounting, payment and transfer processes, etc.), account generation and maintenance, risk analysis and fraud prevention, promotional strategies (e.g., advertisement, benefit conferral, etc.), credit and loan procurement, and the like. For example, rules may be implemented with a risk analysis system and operations of the transaction processor, where one or more specific rules may be utilized to determine if a buyer in a transaction is fraudulent. A rule for risk analysis may take, as input, various characteristics of the buyer, seller, transaction, accounts, or other data associated with the transaction, and process that data for a set of rule attributes or variables, where the attributes cause an outcome or output of the rule that indicates potential fraud. However, rules and rule testing as discussed herein may be implemented with any business system across any industry type where rule-based decision making may be implemented and utilized.

Thus, the rule assists the service provider in making automated decisions regarding specific operations and processes provided by the service provider's platform based on the attributes that may be processed across a set of input data. The rules therefore correspond to business rules of the service provider, that may be coded in executable computer code to allow for output of a particular outcome based on the input data processed by a rule engine using the rules. These rule engines therefore allow intelligent decision-making of the service provider to be automated and certain outputs to be determined to implement processes and service deployments of the service provider. Thus, operational business processes of a service provider may be constructed out of these business rules, which are implemented in business process applications and platforms.

However, when implementing these rules and/or when making changes to rules in deployment, such as changes to attributes or variables (e.g., values for certain outputs, thresholding, attribute outcomes, additional or removal of attributes, etc.), rule testing is required to ensure that the rule operates correctly in practice and provides the correct outcome. Without rule testing, incorrect outcomes make occur for certain rules and/or rule engines, which may cause operational issues with the service provider's systems, exploitation by fraudsters and bad actors, loss of customer satisfaction, and/or an increase in user/account churn rate whereby customers (e.g., buyers, sellers, consumers, merchants, or other entities of a transaction processor) leave the service provider and lead to attrition of the service provider. Thus, the service provider may require a testing mechanism that may be provided by a rule testing framework. This ensures the implementation of the business rules into applications and platforms for the correct execution of the business rules in those applications or platforms. For example, during a financial business process of an application, a developer for the application may implement one or more business rules into an application for use by a service provider in the financial business process. In order to test the application, the developer previously was required to regress over the entire attribute or variable set of the rule based on all possible combinations of values of the attributes, which validates business rules using test data, for example, by testing for implementation of a business rule in the process/application. This can create a large number of combinations. For example, in a binary case of a rule with 1,000 attributes, the possible combinations may be $2^{1000}$ different combinations, which may take considerable time and processing power to complete.

In contrast, a testing mechanism may provide for testing of business rules that define business applications and/or platforms in a linear manner that does not require testing of all possible combinations of values of the attributes for the rules. A user may generate or modify an application, platform, or service provided by the service provider through a software and/or hardware framework using business rules for rules engines that make decisions and provide other output for the service provider. When doing so, the testing mechanism may be implemented by a developer, where the testing mechanism allows testing prior to rule roll out (e.g., implementation and/or change within the service provider system). The testing may be performed on a rule statement that corresponds to an expression of the rule, where the rule expression may correspond to a Boolean expression whereby the attributes or "variables" of the rule expression correspond to Boolean conditions. A Boolean expression corresponds to a particular type of expression containing the set of Boolean conditions (e.g., Boolean operations on the variables for the rule attributes) separated by logical AND or logical OR operators, where logical AND corresponds to a logical conjunction operation and logical OR corresponds to a logical disjunction operation between two or more attributes. Boolean conditions correspond to a statement or query that evaluates to either true or false. Therefore, each attribute of the expression corresponds to a Boolean condition that may evaluate to either true or false based on input data for the variable. For example, a variable of A≥3 (A is some integer), !B (B is a Boolean variable, e.g., true or false), and C="k" (C is some character) are examples of Boolean conditions that may correspond to attributes for the variables of a rule expression. Thus, Boolean conditions for the variable data attributes of the Boolean expression define the rule statement for the rule in two different values (e.g., true or false or other values for a two-state logic system having the variables correspond to one of two different states or options). As such, a rule, as discussed herein, may be referred to as a rule expression, expression, or Boolean expression, where variables may be referred to as a condition or Boolean condition that is associated with the variable (e.g., operates on the variable to evaluate to TRUE or FALSE based on values of the variable).

As previously discussed, iterating over all outcomes for the Boolean conditions (e.g., the variables) creates an exponential output of potential combinations and therefore test cases that a rule testing operation would be required to complete. For example, in the case of four variables (A, B, C, D), the number of combinations is A*B*C*D, which with Boolean conditions becomes 2*2*2*2 or $2^4$=16. In order to test the Boolean expression (e.g., the rule expression) for the rule in a linear manner, instead of testing each variable's values and proceeding through all possible cases, instead one variable is chosen at a time, the remaining variables are set to values that cause the value of the entire Boolean expression to equal the chosen variable. In this manner, the number of test cases may be reduced to the number of outputs of the variables (e.g., two in the case of Boolean conditions) multiplied by the number of variables. In the above example, this reduces the number of testing cases from 16 to 8 (e.g., 2 values×4 variables, or 2*4=8). The time complexity of performing the tests for the rule expression is therefore reduced from an exponential time complexity to a linear time complexity.

In order to perform this testing of a rule statement for a service provider system, two rules may be implemented so that testing of the rule statement may be performed. Generally, those rules are 1. X and TRUE=X; and 2. X or FALSE=X, where X is a Boolean variable. This allows setting of the remaining variable in such a way that makes the rule expression equal to the chosen variable when setting those variables as Boolean variables. For example, if the rule or Boolean expression corresponds to (A and B or C), if B is chosen as the output variable for the expression, then A must be set to be true under the first rule, and therefore variable values of A must make the statement of A's variable true, and C must be set to be false under the second rule, and therefore variable values of C must make the statement of C's variable false. Thus, the rule testing operation may determine that A (as a Boolean condition where some statement must evaluate to true or false) must be true for B to be the output and therefore variable values of A must be set to be true for B. Conversely, if the rule testing operation determines that C must be false for B to be the output, variable values must be set to be false for B to be the output. The rule testing framework may then determine values for A, B, and C as required for each different variable to be the output of the Boolean expression for the rule.

Thereafter, the rule testing operation of the rule testing framework may output the required values for each of the variables based on which variables are selected as the output. This allows for rule testing of each different condition for the system and allows for determination of whether each attribute or variable, and the rule itself, is properly functioning based on the desired output. For example, with rule attributes such as country of origin, device category, account certification, account risk factor, or other attribute that may have a corresponding statement that can be evaluated to be true or false (e.g., matches a value, is equal to or exceeds a value, etc.), each attribute may be tested to determine whether the rule is properly functioning to provide the correct output based on that attribute and the assigned values of the other attributes. This allows for simplified testing of business rules within a service provider's business rules engines when deploying, updating, or revising rules. Thus, data may be entered dynamically and changed, enabling tests to be performed on rules in an expedited manner. This allows further for testing different paths of a business rule building business processes, applications, and platforms dynamically and with less computing time and resources. These business rules may be implemented on any type of business, industry, or organization that utilizes rule-based decision making. In this regard, any such organization may utilize rule testing as described herein to more quickly and efficiently test rule-based decision-making engines of their systems.

Further, if a rule does not behave as required, the testing mechanism may determine a reason for failure (e.g., the values of the other attributes) and output those attributes causing the unwanted or unpredicted failure of the rule (e.g., where the variables do not behave as predicted or desired and have unwanted values). The user may then view test results and compare to expected results to determine whether the business rule has passed or failed the test. The testing mechanism and framework may interact with one or more application programming interfaces (APIs) of different services that may be called for rule testing and determination of the rule expressions. Data may therefore be communicated between different services and operations of the service provider. For example, multiple APIs may exchange risk calls, database calls and/or writes, processing calls for electronic transactions, planning calls, execution calls, or other service calls based on business rules, where the APIs may expose their rules for testing and/or engines for implementation of tested rules.

Figure 1:
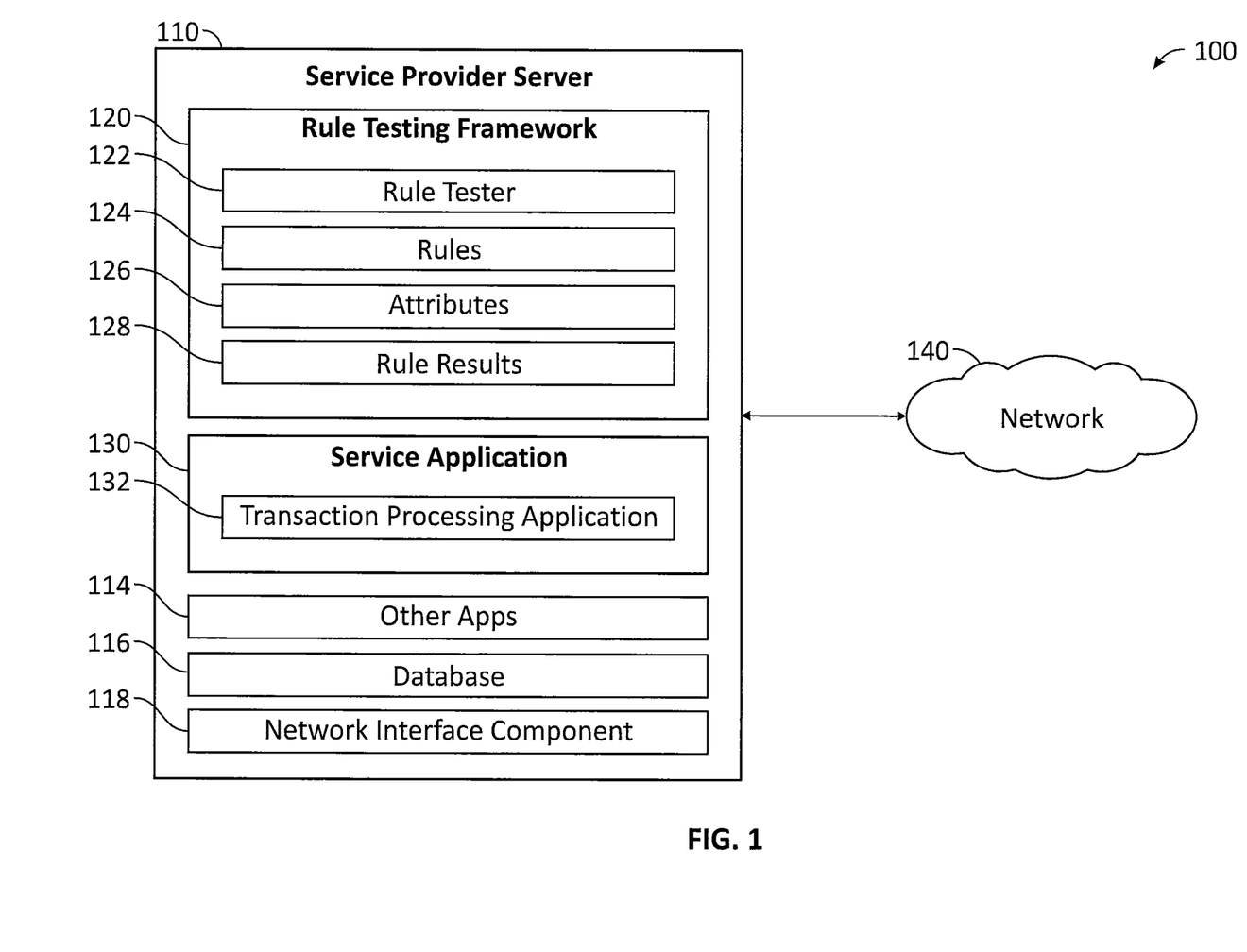
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a service provider server 110 accessible over a network 140. A developer (not shown) may develop and test the various features available for service provider server 110, which may include processes and/or applications that may interact with services provided by service provider server 110, as well as other devices, based on rules and rule engines of service provider server 110. Service provider server 110 may provide a linear testing mechanism and framework for testing of rules prior to and after deployment based on evaluation rules for Boolean expressions associated with those rules. This may reduce the number testing scenarios for a particular rule and may provide faster rule testing by service provider server 110. The rules may then provide services over network 140 to other users or service provider server 110 may provide rule testing results for rules to other entities.

Service provider server 110 may include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Service provider server 110 may be maintained, for example, by an online service provider, which may provide services, including transaction processing and payment services, with other data processing features to users through implemented services of service provider server 110. In this regard, service provider server 110 includes one or more processing applications which may be configured to test rules prior to and after deployment in those services. In one example, service provider server 110 may be provided by PayPal®, Inc. of San Jose, Calif., USA. However, in other embodiments, service provider server 110 may be maintained by or include another type of service provider, which may provide the aforementioned services to a plurality of users.

Service provider server 110 of FIG. 1 includes a rule testing framework 120, service applications 130, other applications 112, a database 114, and a network interface component 116. Rule testing framework 120, service applications 130, and other applications 112 may correspond to executable processes, procedures, and/or applications with associated hardware. In other embodiments, service provider server 110 may include additional or different modules having specialized hardware and/or software as required.

Rule testing framework 120 may correspond to one or more processes to execute software modules and associated specialized hardware of service provider server 110 to provide rule testing of rules implemented in applications, processes, and operations executed by service provider server 110 and/or provided to other devices and servers for execution. In this regard, rule testing framework 120 may correspond to specialized hardware and/or software to execute rule tester 122 to test rules 124 having attributes 126, which results in rule results 128 that include the behavior of the rule for each specific variable of attributes 126 for one of rules 124. For example, rules 124 may correspond to business rules or decision-making rules and expressions for service provider server 110 that provide deterministic outcomes or outputs based on the input for variables of attributes 126 that make up rules 124. Thus, one of rules 124 may be associated with a risk practice, a business practice, an online marketplace platform, a benefit conferrable to users of the service provider system, an advertising strategy, or a promotional program. Each one of rules 124 provides a specific decision based on the input for a user, account, transaction, or other available input data. For example, one of rules 124 may provide a product, an advertisement, a benefit, a risk evaluation, a loan or credit determination, an account establishment determination, an authentication process, or other outcome provided by the services of service provider server 130

Rule tester 122 may be utilized to test one of rules 124 utilizing a linear testing process that tests each individual ones of attributes 126 that makes up that rule of rules 124. For example, a rule of rules 124 may be currently implemented in a production system, or the rule may be required to be rolled out and implemented in an existing or new production system. Testing may be done to ensure that the rule works correctly and provides the correct or desired outcome or output, such as the correct decision or output based on input data to the rule. That rule may have one or more of attributes 126 implemented into the rule so that an outcome or output is provided based on the input data to the variable(s) for attributes 126. Attributes 126 may correspond to a condition that takes some input and produces a value, such as a Boolean statement that takes input and produces a Boolean value (e.g., TRUE or FALSE, 1 or 0, etc.). The rule of rules 124 having one or more of attributes 126 may therefore correspond to a statement, such as a Boolean statement, where the variables of the rule are separated using logical statements (e.g., logical conjunctions, disjunctions, or negations, such as the Boolean operators AND, OR, or NOT, respectively).

Thus, when rule tester 122 operates on the rule to test the rule, rule tester 122 may view the rule as a Boolean expression (the rule or rule expression) having Boolean conditions (the variables). To test the rule, rule tester 122 may select a specific variable or Boolean condition (e.g., A, where the variables are designated by A, B, C . . . ), and determine the required values of the other variables (e.g., the outcome Boolean value for the other variables' Boolean condition, such as TRUE or FALSE). Two rule testing requirements or basic rules may be implemented by rule tester 122 to test the rule, where the requirements are: 1. X or FALSE=X and X and TRUE=X. This allows for testing of just two test scenarios for the selected variable, such as when the selected variable's Boolean condition results in TRUE or FALSE. Therefore, instead of testing each rule individual that has two states or Boolean values, which requires $2^n$ tests (e.g., an exponential test scenario), only 2*n tests (a linear testing function) are require, where n=the number of variables in the rule. Rule tester 122, rules 124, attributes 126, and rule results 128 are discussed in more detail with regard to FIGS. 2A-B.

Service applications 130 may correspond to one or more processes to execute software modules and associated specialized hardware of service provider server 110 to provide services to users for data processing, such as transaction processing using transaction processing application 132. In some embodiments, service applications 130 may provide payment, purchasing, and/or transfer services to the users, for example though a payment account and/or payment instruments of the user and to other users, merchants, or entities, and through transaction processing application 132. In this regard, service applications 130 may correspond to specialized hardware and/or software to provide payment services and payment accounts through software services, which may be provided through transaction processing application 132. In some embodiments, transaction processing application 132 may allow for a payment to a user and/or merchant through a payment instrument, including a credit/debit card, banking account, payment account with service provider server 110, and/or other financial instrument.

In order to establish a payment account for a user to send and receive payments, information may be provided, which may include user personal and/or financial information. Additionally, the information may include authentication information, such as a login, account name, password, PIN, or other account creation information. The user may provide a name, address, social security number, or other personal information necessary to establish an account and/or effectuate payments. Service applications 130 may further allow the user to maintain the payment account, for example, by adding and removing payment instruments. In order to perform transaction processing and/or payments, service applications 130 may utilize transaction processing application 132 to receive and/or generate payment transaction data and process the data, such as by generating a payment instruction and processing the payment instruction. Service applications 130 may also be used to debit an account of the user and provide the payment to an account of the merchant or other user. Service applications 130 may also be used to provide transaction histories for processed transactions. In this regard, service applications 130 may implement one or more rules to provide these services, which may also provide for rule-based validation when providing processes to users. In various embodiments, service provider server 110 includes other applications 112 as may be desired in particular embodiments to provide features to service provider server 110. For example, other applications 112 may include security applications for implementing server-side security features, programmatic client applications for interfacing with appropriate application programming interfaces (APIs) over network 140, or other types of applications. Other applications 112 may contain software programs, executable by a processor, including a graphical user interface (GUI), configured to provide an interface to the user when accessing service provider server 110, where the user or other users may interact with the GUI to more easily view and communicate information. In various embodiments, other applications 112 may include connection and/or communication applications, which may be utilized to communicate information to over network 140.

Additionally, service provider server 110 includes database 114. As previously discussed, a user may establish one or more digital wallets and/or payment accounts with service provider server 110. Digital wallets and/or payment accounts in database 114 may include user information, such as name, address, birth date, payment instruments/funding sources, additional user financial information, user preferences, and/or other desired user data. Users may link to their respective digital wallets and/or payment accounts through an account, user, and/or device identifier. Thus, when an identifier is transmitted to service provider server 110, e.g., from data client 110, one or more digital wallets and/or payment accounts belonging to the users may be found. Database 114 may also store rule expressions and statements having variables, such as business rules of service provider server 110. This rule expressions may include Boolean statements having Boolean conditions, which may be tested by service provider system 110 and implemented in one or more applications, processes, or operations. With regard to testing the rules, database 114 may further store test results from tests of the rules.

In various embodiments, service provider server 110 includes at least one network interface component 116 adapted to communicate over network 140 with other devices, servers, and online resources. In various embodiments, network interface component 116 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2A:
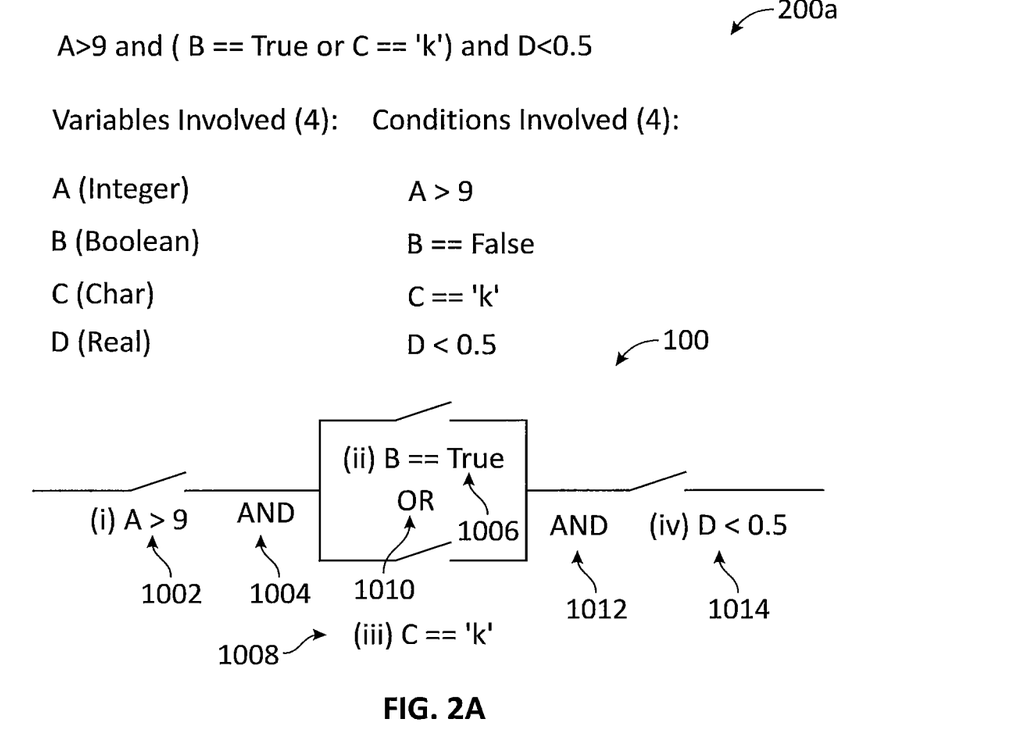
FIG. 2A is an exemplary diagram of a first simplified decision-making expression circuit that allows for testing of rules of a service provider system, according to an embodiment.

FIG. 2A is an exemplary diagram of a first simplified decision-making expression circuit that allows for testing of rules of a service provider system, according to an embodiment. Rule expression 200a in FIG. 2 shows an expression of A>9 and (B==true or C=='k') and D<0.5, which corresponds to a Boolean expression that provides a specific output (e.g., TRUE or FALSE) based on the input values for the variables. Thus, rule expression 200a includes four variables, variables A, B, C, and D, which each have a corresponding condition, such as a Boolean condition. The conditions involved are a condition 1002 (A>9), a condition 1006 (B==true), a condition 1008 (C=='k'), and a condition 1014 (D<0.5). Rule expression 200a is further shown with operators between the conditions (e.g., Boolean operators), including operator 1004 (AND), operator 101 (OR), and operator 1012 (AND). Evaluation rule expression 200a to be TRUE may indicate approval to send a promotion, process a transaction, provide a benefit, evaluate a risk scenario (e.g., exceeds or does not exceed risk tolerance), or otherwise provide some output or outcome for the application, process, or operation that incorporates rule expression 200a. Rule expression 200a may be written in a coding or scripting language for implementation into a service provider software framework or other data processing architecture.

Previous testing requires the rule testing engine to enumerate through all cases of the values for the Boolean conditions of conditions 1002, 1006, 1008, and 1014. This therefore requires testing each possible value (e.g., TRUE or FALSE) for each condition. The following table provides a breakdown of testing each variable for the rule expression, which results in $2^n$ tests, or here $2^4=16$ tests.

D<0.5=TRUE. We then test two scenarios, A>9=TRUE (A=11) and A>9=FALSE (A=7).

To test B==TRUE with both positive and negative scenarios, let us set all base rules such that, A>9=TRUE, C=='k'=FALSE, D<0.5=TRUE. We then test two scenarios, B=TRUE and B=FALSE.

To test C=='k' with both positive and negative scenarios, let us set all base rules such that, A>9=TRUE, B=FALSE, D<0.5=TRUE. We then test two scenarios, C==TRUE (C='k') and C=='k'=FALSE (e.g., C='x').

To test D<0.5 with both positive and negative scenarios, let us set all base rules such that, A>9=TRUE, (B==true or

TABLE 1

| S# | Binary (4 variable) | A | B | C | D | A > 9 | B == TRUE | C = 'k' | D < 0.5 | A > 9 and (B == true or C == 'k') and D < 0.5 |
|---|---|---|---|---|---|---|---|---|---|---|
| 0 | 0000 | 7 | TRUE | X' | 0.6 | FALSE | FALSE | FALSE | FALSE | FALSE |
| 1 | 0001 | 7 | TRUE | X | 0.4 | FALSE | FALSE | FALSE | TRUE | FALSE |
| 2 | 0010 | 7 | TRUE | K' | 0.6 | FALSE | FALSE | TRUE | FALSE | FALSE |
| 3 | 0011 | 7 | TRUE | K' | 0.4 | FALSE | FALSE | TRUE | TRUE | FALSE |
| 4 | 0100 | 7 | FALSE | X' | 0.6 | FALSE | TRUE | FALSE | FALSE | FALSE |
| 5 | 0101 | 7 | FALSE | X | 0.4 | FALSE | TRUE | FALSE | TRUE | FALSE |
| 6 | 0110 | 7 | FALSE | K' | 0.6 | FALSE | TRUE | TRUE | FALSE | FALSE |
| 7 | 0111 | 7 | FALSE | K' | 0.4 | FALSE | TRUE | TRUE | TRUE | FALSE |
| 8 | 1000 | 11 | TRUE | X' | 0.6 | TRUE | FALSE | FALSE | FALSE | FALSE |
| 9 | 1001 | 11 | TRUE | X | 0.4 | TRUE | FALSE | FALSE | TRUE | FALSE |
| 10 | 1010 | 11 | TRUE | K' | 0.6 | TRUE | FALSE | TRUE | FALSE | FALSE |
| 11 | 1011 | 11 | TRUE | K' | 0.4 | TRUE | FALSE | TRUE | TRUE | TRUE |
| 12 | 1100 | 11 | FALSE | X' | 0.6 | TRUE | TRUE | FALSE | FALSE | FALSE |
| 13 | 1101 | 11 | FALSE | X | 0.4 | TRUE | TRUE | FALSE | TRUE | TRUE |
| 14 | 1110 | 11 | FALSE | K' | 0.6 | TRUE | TRUE | TRUE | FALSE | FALSE |
| 15 | 1111 | 11 | FALSE | K' | 0.4 | TRUE | TRUE | TRUE | TRUE | TRUE |

However, utilizing testing scenario 1000, a rule tester (e.g., rule tester 122 of rule testing framework 120), for the rule may instead test each variable individually to determine the required states or values of the other variables. In order to do this, two basic assumptions or rules may be made by the rule tester as follows:

1. X and TRUE=X (e.g., if X is TRUE, X and TRUE=TRUE, if X is FALSE, X and FALSE=FALSE, hence X and TRUE=X) and 2. X or FALSE=X, (e.g., if X is TRUE, X or FALSE=TRUE, if X is FALSE, X or FALSE=FALSE, hence X or FALSE=X).

Thus, a single variable (e.g., A, corresponding to condition 1002) may be selected, and the required output values (e.g., TRUE or FALSE for Boolean conditions) may be determined for conditions 1006, 1008, and 1014. This allows for determination of the corresponding values that the variable can be to make conditions 1006, 1008, and 1014 evaluate to their required output of TRUE or FALSE. In testing scenario 1000, a circuit diagram corresponding to the Boolean expression is shown based on the operators, where an open switch is equal to FALSE and a closed switch is equal to TRUE. Therefore, the switches, which may be any suitable electronic switch, including transistor type switches, may be opened and closed as necessary to make a certain variable and corresponding condition as the outcome or output to rule expression 200a.

For example, taking each variable separately, the following presents the test cases for each variable:

To test A>9 with both positive and negative scenarios, let us set all base rules such that, (B==true or C=='k')=TRUE, C=='k')=TRUE, D<0.5=TRUE. We then test two scenarios, D<0.5=TRUE (D=0.4) and D<0.5=FALSE (D=0.6).

This therefore allows for reducing the number of test cases for each variable by determining required values for the other variables so that rule expression 200a evaluates to either true or false for the specific variable. Thus, 100% of test cases can be covered by determining how each individual variable and condition affects the outcome of rule expression 200a. This allows for testing of rule expression 200a to be reduced from $2^n$ tests, (e.g., with the four above variables, the number of test for rule expression 200a would be $2^4=16$ tests) to 2*n tests (e.g., with the four above variables, the number of test for rule expression 200a would be reduced to 2*4=8 tests).

Figure 2B:
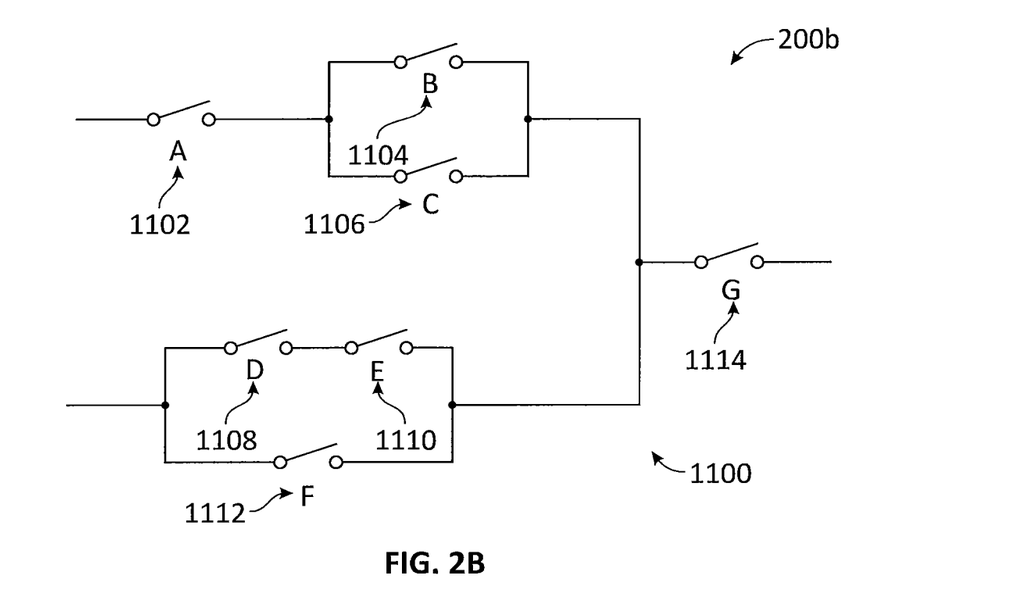
FIG. 2B is an exemplary diagram of a first simplified decision-making expression circuit that allows for testing of rules of a service provider system data, according to an embodiment.

FIG. 2B is an exemplary diagram of a first simplified decision-making expression circuit that allows for testing of rules of a service provider system data, according to an embodiment. FIG. 2B includes a testing scenario 1100, which may correspond to a Boolean expression for a rule tested by a service provider, for example, for rollout into a production application or process or implement in production (e.g., when a variable or attribute of the rule may be changed, deleted, or added, including changing ordering of operators and the like). In this regard, the Boolean expression for testing scenario 1100 corresponds to (BE), where (BE)=A and (B or C) or (D and E or F) and G. A, B, C, D, E, and G correspond to Boolean conditions or other attributes that evaluate to true or false based on input to the corresponding variable. For example, a Boolean condition may compare two numbers or values (e.g., using==, >=, and the like). For example, A may correspond to A>=3, which may return true of false based on input values for A (e.g., the input to A when the Boolean expression is being used to evaluate a data set).

In this regard, the Boolean expression may be written as "sellerisfromUS and (sellerisCertified or saleincategory(laptops)) or (D and E or F) and G" for particular conditions or attributes that make up A, B, and C. Thus, A evaluates to be TRUE when input for a seller in a transaction is from the US, but otherwise evaluates to be FALSE. Similarly, for B, the seller is required to be certified for B to evaluate to be true, and false otherwise. Other types of attributes and variables may also be used, and other Boolean conditions may be written differently depending on the desired outcome of the rule. Testing scenario 1100 functions similar to testing scenario 1000 in FIG. 2A. For example, when viewing the circuit diagram, open switches mean that variable is set to FALSE and open switches mean that variable is set to TRUE. Thus, testing scenario is shown with a switch A 1102, a switch B 1104, a switch C 1106, a switch D 1108, a switch E 1110, a switch F 1112, and a switch G 1114 each corresponding to their variable of the Boolean expression. As shown in FIG. 2B, all switches are open in an initial testing, where each switch is then evaluated to make a specific variable the outcome of the Boolean expression.

In order to test a particular variable, that variable is selected. For example, when selecting C at the output of the Boolean expression, the other switches have to be: Switch A 1102—closed, switch B 1104—open, and switch G 1114—closed. As shown, this allows the outcome (e.g., the current to flow from the start at switch A 1102 to the output of switch G 1114) to be dependent on opening and closing switch C 1106. Thus, C is the reference variable as setting switch C 1106 to TRUE (closed) or FALSE (open) cause the circuit to be complete (closed for switch C 1106) or broken (open for switch C 1106).

However, the effective value of (switch D 1108 and switch E 1110 or switch F 1112) has to be open as if a complete circuit is made by either closing switch F 1112, or closing both switch D 1108 and switch E 1110, then the effective state of C (switch C 1106 being the reference variable) is no longer the output for the Boolean expression. With reference to the Boolean expression, in order to set (D and E or F) to FALSE (open for (switch D 1108 and switch E 1110 or switch F 1112)), there are a few scenarios. For example, switch F 1112 is required to always be open. An effective combination of (D and E) is required to be FALSE. This is achieved by selecting one of the following switch states ({switch D 1108—closed, switch E 1110—open}, {switch D 1108—open, switch E 1110—closed}, {switch D 1108—open, switch E 1110—open}).

We can then substitute this testing into the Boolean expression of A and (B or C) or (D and E or F) and G when testing C. A must be TRUE and G must be TRUE, while B must be FALSE and F must be FALSE. Any combination of D and E that evaluates to FALSE is sufficient. Thus, we are left with (BE)=C=TRUE and (FALSE or C) or (TRUE and FALSE or FALSE)=TRUE and C or (FALSE or FALSE)=C or FALSE=C. Thus, if the state of C is set to TRUE, the value of the Boolean expression is TRUE and if C is set to FALSE, the value is FALSE.

Figure 3:
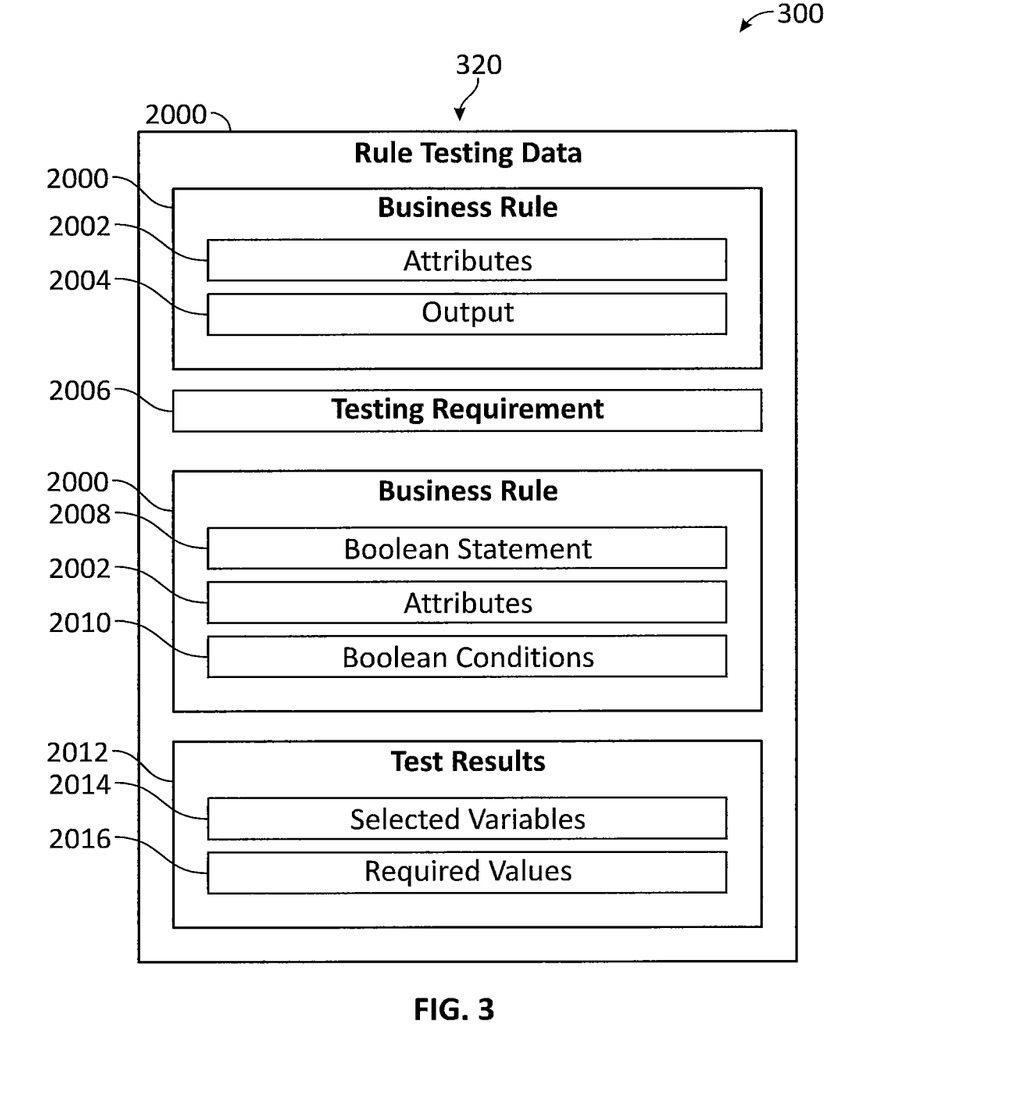
FIG. 3 is a block diagram of an exemplary service provider system that efficiently tests rules and rule attributes utilizing Boolean expressions, according to an embodiment.

FIG. 3 is a block diagram of an exemplary service provider system that efficiently tests rules and rule attributes utilizing Boolean expressions, according to an embodiment. System 300 includes service provider server 110 discussed in reference to system 100 of FIG. 1.

In this regard, service provider server 110 includes a rule testing framework that may be utilized to test rules for their specific results depending on the input to variables of the rules. For example, service provider server 110 includes and operates on rule testing data 320 when evaluating a business rule 2000. This business rule 2000 may correspond to some decision-making operation, written in or for an application, process, operation, or other production computing service provided by service provider server 110. For example, business rule 2000 may cause an outcome or output of an operation provided through services of service provider server 110. These services may include any computing service that service provider server 110 may provide to users, merchants, partners, or other online entities. For example, the services may be associated with electronic transaction processing, messaging, risk policies, benefits, promotions, searches, matching processing, or other services.

Service provider server 110 may determine attributes 2002 for business rule 2000, which may correspond to those particular logical statements that operate on a particular variable that takes input from a requested execution of a process or operation associated with business rule 2000. For example, an attribute or attributes 2002 may correspond to a Boolean condition that compares two values to determine a TRUE or FALSE outcome. Business rule 2000 may also be associated with an output 2004, which corresponds to the desired output of business rule 2000 depending on the input data. For example, for a business rule that corresponds to sending a promotion to a user if the user meets certain criteria, output 2004 may be the criteria that the user is required to meet (e.g., lives in a certain country, has over a certain amount of sales or purchases, has an account balance of greater than X, has an account age of greater or less than Y, etc.). Thus, service provider server 110 may want to test business rule 2000 to ensure proper compliance with output 2004.

Thus, a testing requirement 2006 may be requested for business rule 2000. Testing requirement 2006 may operate before or when business rule 2000 is in production with a corresponding product or service of service provider server 110. A Boolean expression 2008 is determined for business rule 2000, which may correspond to the coded processes of business rule 2000 to operate on input data. Attributes 2002 therefore correspond to Boolean conditions 2010 that make up Boolean expression 2008. Thereafter, selecting each of Boolean conditions 2010 so that the corresponding variable is the output of Boolean expression 2008, test results 2012 are determined. These test results 2012 include the required values of each variable for Boolean conditions 2010 so that the states (e.g., TRUE or FALSE) of Boolean conditions 2010 cause the selected variable to be the output (thereby causing the variables corresponding Boolean condition to cause Boolean expression 2008 to evaluate to TRUE or FALSE when that Boolean condition is TRUE or FALSE). Test results 2012 therefore include selected variables 2014 for each selection of variables and corresponding required values 2016 for selected variables 2014.

Figure 4:
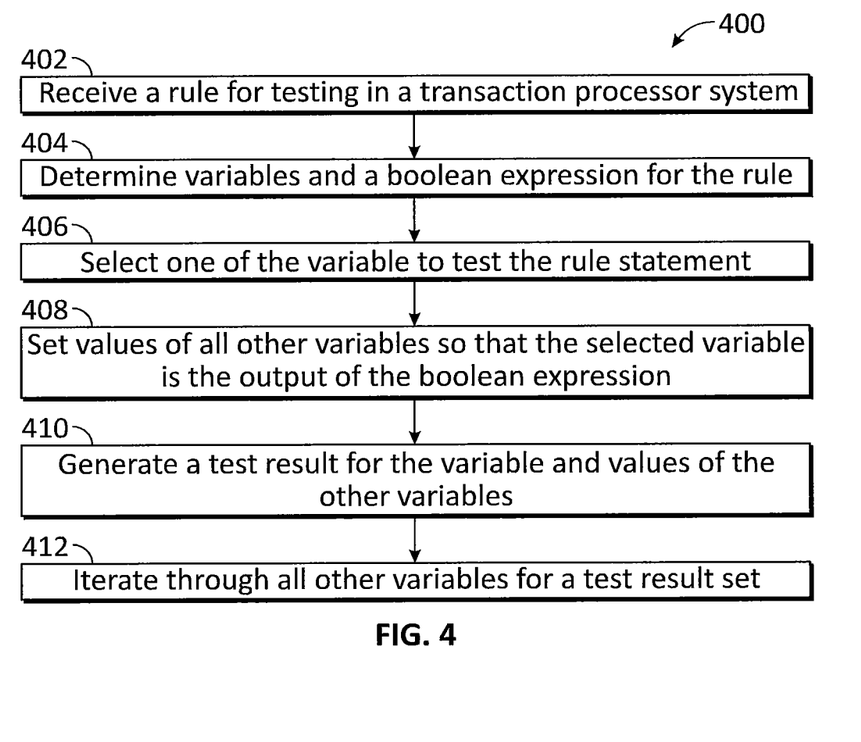
FIG. 4 is a flowchart of an exemplary process for a rule testing framework for executable rules of a service provider system, according to an embodiment.

FIG. 4 is a flowchart of an exemplary process for a rule testing framework for executable rules of a service provider system, according to an embodiment. Note that one or more steps, processes, and methods described herein of flowchart 400 may be omitted, performed in a different sequence, or combined as desired or appropriate.

At step 402 of flowchart 400, a rule for testing in a transaction processor system is received. The rule corresponds to some coded expression that evaluates to provide a specific output based on the input data from the system. This input data may depend on the application, process, or operation utilizing the rule, as well as the specific input scenario (e.g., a user, item, and merchant within a transaction for electronic processing. For example, a rule may assert whether a transaction is allowed to be processed based on correct input data (e.g., credit card, amount, shipping/ billing address, etc.). However, rules may also collectively make up an operation and an operation may include several different rules that function to provide the output, including rules that provide input to other rules. For example, proceeding with electronic transaction processing between a user and a merchant may include a risk rule, a promotional rule, a benefit conferred or used rule, a return policy rule, a shipping/billing rule, an authorization and/or authentication rule, and the like. Thus, the transaction processor system may be made up of many different rules that operate to provide services and product to users of that system (e.g., consumers, merchants, partners, etc.).

At step 404, variables and a Boolean expression for the rule are determined, which may correspond to the coded expression for the rule that provides an outcome or output based on input data for each of the variables that make up the Boolean expression. Each of these variables is associated with a particular logical statement or Boolean condition that evaluates to be TRUE or FALSE depending on the input data for the variable (e.g., an integer, a specific value, a denomination type, a country of residence, a transaction type or class, etc.). For example, a variable A may be required to be greater than or equal to 5 for a particular condition of the expression. Each of these required scenarios may be determined to provide a full Boolean expression that evaluates to be TRUE or FALSE depending on the input. Further, the evaluation of the Boolean expression may cause the corresponding decision of the transaction processor system. For example, when the expression evaluates to be TRUE, a benefit or promotion may be provided, authentication may be validated, a transaction may be processed, etc., and vice versa.

At step 406, one of the variables to test the rule statement is selected. This is done instead of iterating through all values of the variables individually, which, when using Boolean expressions having Boolean conditions for variables, requires $2^n$ different tests (therefore an exponential testing function, where n is the number of variables in the Boolean expression). Instead, by selecting each variable at a time, only variables with different states are tested at a time, therefore requiring only $2*n$ different tests (therefore a linear testing function, reducing the number of required tests especially in the case of high variable count rules).

At step 408, all of the other variables in the Boolean expression have their values set so that the selected variable is the output of the Boolean expression. In this regard, when a variable is selected, that variable becomes the determining reference variable for the Boolean expression. Therefore, that variable should now be the determining factor of whether the Boolean expression evaluates to be TRUE of FALSE. For example, if A is selected in the above example, the other variables' values are set so that only when A is greater than or equal to 5 (thereby making the corresponding Boolean condition TRUE) does the Boolean expression of the rule evaluate to be TRUE, and vice versa for when A is less than 5 (e.g., the Boolean expression now evaluates to be FALSE based on the values set for the rest of the variables). This is done by making basic rules necessary to determine the values of the other variables. For example, A and TRUE equals A, which means when A is with the Boolean operator AND, the expression evaluates to be the Boolean value of A's condition (and therefore input value). Additionally, A or FALSE equals A, which means when A is with the Boolean operator OR, the expression evaluates to be the Boolean value of A's condition (and therefore input value).

At step 410, a test result is generated for the variable and the values of the other variables. The test result therefore shows what the required values (or value ranges) of particular variables are required to be when the selected variable is the output of the Boolean expression. This allows a reviewer of the rule to determine what the effects of particular inputs to the variable (as well as the other variables) are on whether the Boolean expression is TRUE of FALSE. Therefore, based on particular input, the outcome of the rule may be determined. Thereafter, at step 412, the rule testing operation iterates through all other variables testing in a similar manner to generate a full set of test results. This allows a tester of the rule to view the outcome of a particular variable for the rule and whether that variable is properly functioning within the rule with the other variables (e.g., based on the desired outcome of the rule).

Figure 5:
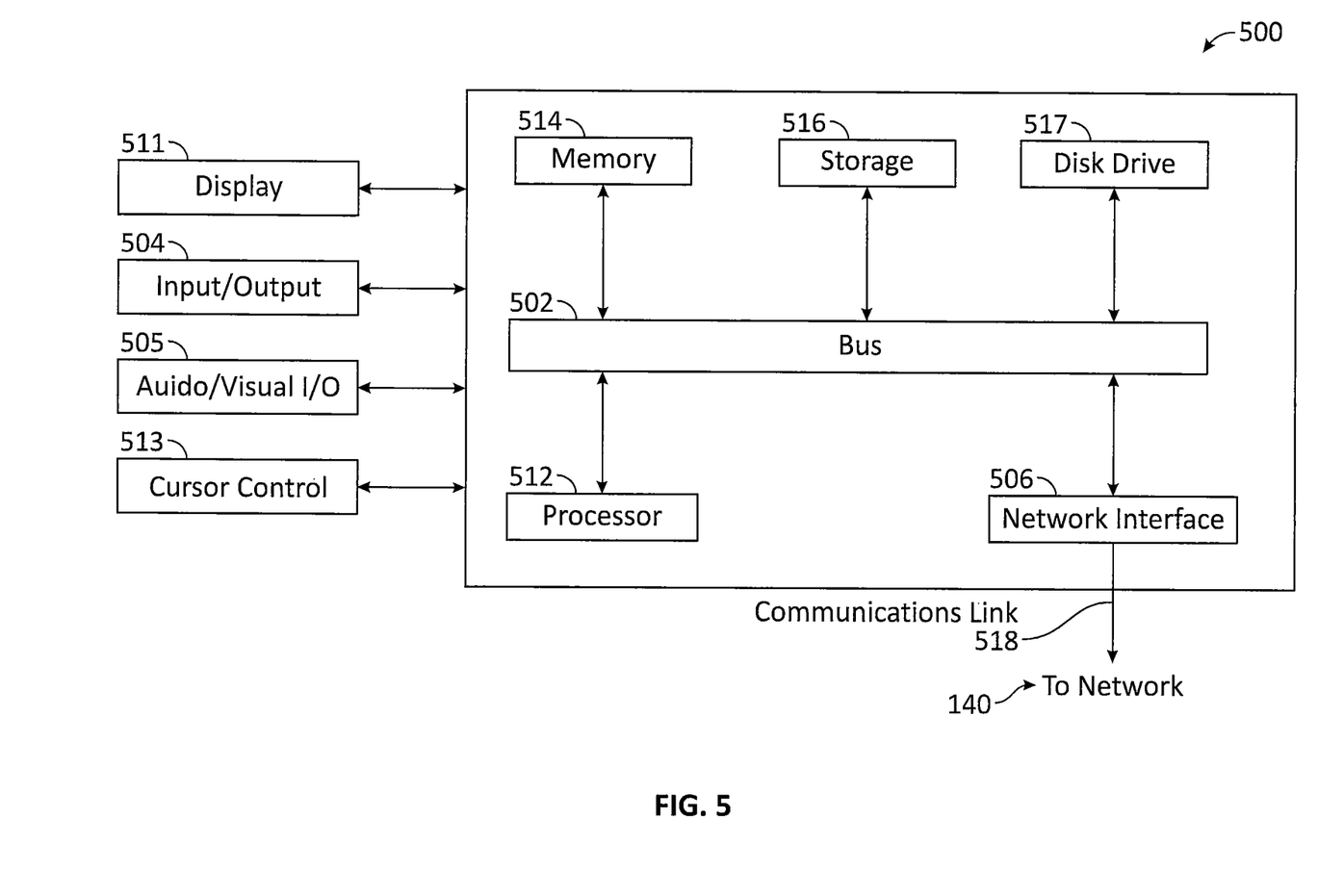
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes, a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:
a non-transitory memory; and
one or more hardware processors coupled to the non-transitory memory and configured to read instructions from the non-transitory memory to cause the service provider system to perform operations comprising:
receiving a rule expression comprising a plurality of variable attributes, wherein the rule expression is associated with an output decision for a processing engine of the service provider system based on input values for the plurality of variable attributes;
determining a first variable attribute of the plurality of variable attributes for a first outcome of the rule expression;
determining first values for first other ones of the plurality of variable attributes required for the first variable attribute to be the first outcome of the rule expression;
setting the first other ones of the plurality of variable attributes for the rule expression as the first values to reduce a number of test cases of the rule expression;
executing programming instructions for the rule expression to generate a test result for the first variable attribute of the rule expression based on the first values for the first other ones of the plurality of variable attributes;
determining the test result indicates a failure of the rule expression;
identifying one of the first other ones of the plurality of variable attributes causing the failure based on the first values; and
outputting the one of the first other ones of the plurality of variable attributes with an identification of the failure for the rule expression.

2. The service provider system of claim 1, wherein each of the plurality of variable attributes are separated by one of a plurality of logical statements for the rule expression, and wherein the determining the first values comprises setting Boolean conditions corresponding to the plurality of variable attributes as one of true or false to cause the rule expression to evaluate to the first variable attribute based on the plurality of logical statements of the rule expression.

3. The service provider system of claim 1, wherein the plurality of variable attributes comprises variables for the rule expression associated with rule outcomes of the rule expression, wherein the rule outcomes are dependent on input values for the variables, and wherein the number of the test cases of the rule expression is reduced from an exponential number of the test cases based on a number of the plurality of variable attributes to a linear number of the test cases based on the number of the plurality of variable attributes.

4. The service provider system of claim 3, wherein the variables are associated with one or more of a user account parameter, a user device specification, user information, or transaction information for the service provider system.

5. The service provider system of claim 1, wherein the operations further comprise:
determining a second variable attribute of the plurality of variable attributes different from the first variable attribute for a second outcome of the rule expression; and
determining second values for second other ones of the plurality of variable attributes required for the second variable attribute to be the second outcome of the rule expression.

6. The service provider system of claim 5, wherein the test result further comprises the second values specific to the second variable attribute with the first values specific to the first variable attribute.

7. The service provider system of claim 1, wherein the rule expression is associated with a rule to execute a process of the service provider system, and wherein the rule is associated with one of a risk practice, a business practice, an online marketplace platform, a benefit conferrable to users of the service provider system, an advertising strategy, or a promotional program.

8. The service provider system of claim 1, wherein the rule expression is associated with a Boolean expression, and wherein the determining the first values uses the Boolean expression.

9. The service provider system of claim 8, wherein the plurality of variable attributes are associated with Boolean conditions having two outputs for each of the Boolean conditions, and wherein the first values comprise one of two outputs for the Boolean conditions.

10. The service provider system of claim 9, wherein each of the plurality of variable attributes are associated with one of a logical conjunction or a logical disjunction for the Boolean expression.

11. The service provider system of claim 10, wherein the determining the first values utilizes two testing rules for evaluating the Boolean expression based on the logical conjunction or the logical disjunction for the plurality of variable attributes.

12. A method comprising:
   determining, by a service provider, a testing requirement for a rule of the service provider, wherein the rule comprises a constraint statement for the service provider that provides a service output determination to a user;
   determining a plurality of attributes for the rule based on the testing requirement;
   selecting an attribute of the plurality of attributes to be an output of the rule;
   determining values for other ones of the plurality of attributes for the attribute to be the output of the rule, wherein the determining the values reduces required variable testing of the plurality of attributes for the testing requirement based on the selecting the attribute to be the output;
   setting the other ones of the plurality of attributes for the rule as the values;
   executing programming instructions for the rule with the values for the other ones of the plurality of attributes;
   providing, based on the executing, a result of the testing requirement of the rule based on the values for the other ones of the plurality of attributes;
   determining the result indicates a failure of the rule;
   identifying one of the other ones of the plurality of attributes causing the failure based on the values; and
   outputting the one of the other ones of the plurality of attributes with an identification of the failure for the rule.

13. The method of claim 12, wherein prior to the providing the result, the method further comprises:
   repeating the selecting and the determining the values through each of the other ones of the plurality of attributes.

14. The method of claim 12, wherein prior to the selecting the attribute, the method further comprises:
   generating a Boolean expression for the rule based on the plurality of attributes,
   wherein determining the values for the other ones of the plurality of attributes uses the Boolean expression.

15. The method of claim 14, wherein the plurality of attributes comprise variable expressions for the rule, wherein the values comprise Boolean conditions that evaluate to one of true or false for the Boolean expression.

16. The method of claim 12, wherein the rule comprises one of an implemented rule deployed in a production of the service provider to implement a service with the user or a prospective rule requiring testing prior to deployment in the production.

17. A non-transitory machine-readable medium having stored thereon machine-readable instructions executable to cause a machine to perform operations comprising:
   receiving a rule expression for a rule of a service provider, wherein the rule expression comprises variable rule parameters for the rule of the service provider that determines an outcome of a decision associated with the rule;
   executing a test of the rule expression for the service provider, wherein the executing comprises:
      selecting one of the variable rule parameters to set as an output to the rule expression,
      setting values for other ones of the variable rule parameters to cause the selected one of the variable rule parameters to be the output of the rule expression,
      executing programming instructions for the rule expression with the values for the other ones of the variable rule parameters, and
      determining, based on the executing, a test result for the rule expression based on the setting the values, wherein the test result comprises a determination of whether the rule expression comprises an expected result for the selected one of the variable rule parameters based on the values;
   outputting the test result for the test of the rule expression based on the values so that different values of each of the other ones of the variable rule parameters are not tested for the selected one of the variable rule parameters;
   determining the test result indicates a failure of the rule expression;
   identifying one of the other ones of the variable rule parameters causing the failure based on the values; and
   outputting the one of the other ones of the variable rule parameters with an identification of the failure for the rule expression.

18. The non-transitory machine-readable medium of claim 17, wherein the setting the values for the other ones comprises determining a Boolean value for a Boolean condition of each of the other ones that is required to cause the selected one of the variable rule parameters to be output.

19. The non-transitory machine-readable medium of claim 17, wherein the expected result comprises a rule output of the rule expected for a user that satisfies the variable rule parameters.

20. The non-transitory machine-readable medium of claim 19, wherein the rule output comprises one of a benefit provided to the user, a risk analysis of the user, or a promotion for the user.

* * * * *